United States Patent [19]

Steidl et al.

[11] Patent Number: 5,018,368
[45] Date of Patent: May 28, 1991

[54] MULTI-STAGED DESICCANT REFRIGERATION DEVICE

[75] Inventors: Gary V. Steidl, Olivenhain; Cullen M. Sabin, San Diego; Dennis A. Thomas, Malibu, all of Calif.

[73] Assignee: International Thermal Packaging, Inc., Westlake Village, Calif.

[21] Appl. No.: 420,282

[22] Filed: Oct. 12, 1989

[51] Int. Cl.⁵ ............................................. F25B 17/08
[52] U.S. Cl. ...................................... 62/480; 62/101; 62/294
[58] Field of Search ..................... 62/480, 101, 294

[56] References Cited

U.S. PATENT DOCUMENTS

| | | | |
|---|---|---|---|
| 2,144,441 | 1/1939 | Schlumbohm | 62/480 |
| 2,871,674 | 2/1959 | Koivisto et al. | 62/101 |
| 3,316,736 | 5/1967 | Biermann | 62/294 |
| 3,642,059 | 2/1972 | Greiner | 62/480 |
| 3,726,106 | 4/1973 | Jaeger | 62/48 |
| 3,950,960 | 4/1976 | Kawam | 62/48 |
| 3,967,465 | 7/1976 | Asselman et al. | 62/294 |
| 3,970,068 | 7/1976 | Sato | 62/294 |
| 4,126,016 | 11/1978 | Greiner | 62/480 |
| 4,205,531 | 6/1980 | Brunberg et al. | 62/101 |
| 4,250,720 | 2/1981 | Siegel | 62/480 |
| 4,682,476 | 7/1987 | Payre et al. | 62/480 |
| 4,736,599 | 4/1988 | Siegel | 62/480 |
| 4,759,191 | 7/1988 | Thomas et al. | 62/101 |
| 4,949,549 | 8/1990 | Steidl et al. | 62/101 |

FOREIGN PATENT DOCUMENTS 2095386 9/1982 United Kingdom .................. 62/371

Primary Examiner—Henry A. Bennet
Assistant Examiner—John Sollecito
Attorney, Agent, or Firm—Knobbe, Martens, Olson & Bear

[57] ABSTRACT

Disclosed is a multi-staged desiccant refrigeration device which employs an evaporator combined with a multi-staged vapor desiccant/heat sink module which absorbs water vapor from the evaporator. A plurality of stage vapor desiccant/heat desiccant modules are incorporated in the device, the automatic staged opening and closing of the modules allowing for a continuous and more efficient refrigeration process.

8 Claims, 2 Drawing Sheets

MULTI-STAGED DESICCANT REFRIGERATION DEVICE

BACKGROUND OF THE INVENTION

The vapor pressure of refrigerants, particularly water, decreases as the temperature decreases, so that the operating pressure is small near the end of discontinuous refrigerant operation.

Vapor desiccants also have higher vapor pressures at higher temperatures and thus have a decreasing capacity for water vapor as the temperature of the system increases.

Therefore, as the cooling process proceeds in a conventional desiccant refrigeration system, the available vapor supply pressure falls, the vapor absorption pressure rises and the capacity of the desiccant decreases, so the characteristics of the evaporation and the desiccant-/heat sink portions of the system are not ideally matched. This inequality provides the principal limitation on minimizing the size of such a refrigerant system, and contributes to the time required to cool the system to the designed temperature.

If a portion of the released heat is transferred to a heat sink material, the desiccant temperature is lessened, so that the desiccant can absorb more water vapor. There is an optimum choice of ratio of heat sink mass-desiccant mass which for a given combination of materials gives a minimum total mass and volume for a given short time water absorption which can be determined easily.

Three physical characteristics affect the amount of water vapor which a desiccant can absorb in a short period of time.

The first characteristic is the relationship between desiccant water vapor capacity and desiccant temperature. The amount of water which all common desiccants can contain decreases with temperature due to their decreasing capacity for water vapor due to their higher vapor pressure at higher temperatures.

The second characteristic which affects performance of the desiccant is the amount of chemical reaction energy released when the water is bound into the desiccant. Any water vapor absorption process releases the latent heat of vaporization of the water into the desiccant when the molecule is bound into the desiccant structure of molecular motions.

However, most desiccants also react chemically with the water in an exothermic process. Two commercially available desiccants, Drierite (a calcium sulphate desiccant available from W.A. Hammond Drierite Co. Xenia, OH and Multiform molecular sieve 4A, (a synthetic zeolite molecular sieve available from Multiform Desicants, Inc., Buffalo, New York) exhibit an exothermic chemical reaction when reacting with water. In the case of the Multiform desiccant, the reaction heat is 80% of the water vapor latent heat. Therefore, 1.8 calories of heat are released into the desiccant for every calorie of heat absorbed from the cooled material in the refrigerator evaporator.

The final characteristic is the vapor pressure over the desiccant in a conventional single-use desiccant refrigerator apparatus. In such an apparatus, the desiccant is analogous to both the pump and condenser found in the conventional refrigeration cycle. This value, which increases with temperature, is equivalent to the suction pressure in a compressor refrigerant process at the refrigerator compressor inlet.

This increased pressure (reduced suction) reduces the refrigeration efficiency of the apparatus as the single-use, non-cyclical desiccant refrigeration process proceeds. As the temperature of the material being cooled falls, the refrigerant (e.g. evaporating water) vapor pressure decreases, thereby reducing the pressure of the vapor supplied to the desiccant. Simultaneously, the temperature of the desiccant rises, thereby increasing the vapor pressure of the desiccant and water absorption rises so that vapor flow from water to desiccant becomes small. Conventional desiccant refrigerant devices have not breached the issue of modifying the evaporator pressure decrease with decreasing temperature.

SUMMARY OF THE INVENTION

The present invention relates to a desiccant refrigeration device employing an evaporator combined with a multi-staged vapor desiccant-heat sink module to absorb water vapor from the beverage cooler. The refrigeration device consists of a plurality of staged vapor desiccant-heat desiccant modules, so that the desiccants and heat sinks can be employed to higher temperatures during the early part of the cooling process where evaporator pressures are high, and are then valved off at the same time a fresh desiccant section is exposed, thereby more closely matching the requirements of the evaporator and providing a continuous refrigerating process.

Thus, the present invention provides a refrigeration apparatus, comprising a refrigerant chamber containing an evaporatable refrigerant liquid, a plurality of desiccant chambers, each containing a sorbent material for the liquid, at least one conduit for conducting vaporized refrigerant liquid to the chambers, and one or more valves for directing the vapor to each the chamber in sequence, so that sorbent in a first such chamber contacts the vapor first, until at least a portion of the sorptive capacity of the sorbent in the first chamber is exhausted, and then a first the valve directs the vapor into a second such chamber. In one embodiment, the valves open when they attain a predetermined temperature. Preferably, the valves are opened by the melting of a phase change material which can be a wax such as a paraffin.

In a preferred embodiment, a second valve directs the vapor into a third chamber after at least a portion of the sorptive capacity of sorbent in the second chamber is exhausted.

In another variation of the apparatus, the refrigerant chamber contains a wicking material adapted to increase the surface area from which evaporation of the liquid can take place. The wicking material preferably lines the interior surface of the refrigerant chamber.

Also provided by the present invention is a method for facilitating the effective sorption of a refrigerant vapor by a sorbent in a refrigeration apparatus, comprising the steps of directing refrigerant vapor into a first mass of sorbent material until at least a portion of the sorptive capacity thereof is exhausted, and then directing the refrigerant vapor into a second mass of sorbent material. The method may also include the steps of continuing to direct the refrigerant material into the second mass of sorbent material until at least a portion of the sorptive capacity of the second mass is exhausted, and then directing the refrigerant vapor into a third mass of sorbent material.

In one embodiment, the masses of desiccant material are in separate chambers, and the directing steps are accomplished by opening valves to permit the vapor to contact the masses. Preferably, at least one of the valves is opened in response to temperature, and may be opened by the melting of a phase change material, such as a paraffin wax.

In another embodiment, the method includes the step of generating the refrigerant vapor in a refrigerant chamber having a wicking material therein by permitting at least a portion of the refrigerant to evaporate from the wicking material. Preferably, the wicking material lines the interior of the refrigerant chamber.

DETAILED DESCRIPTION OF THE PREFERRED EMBODIMENT

Figure 1:
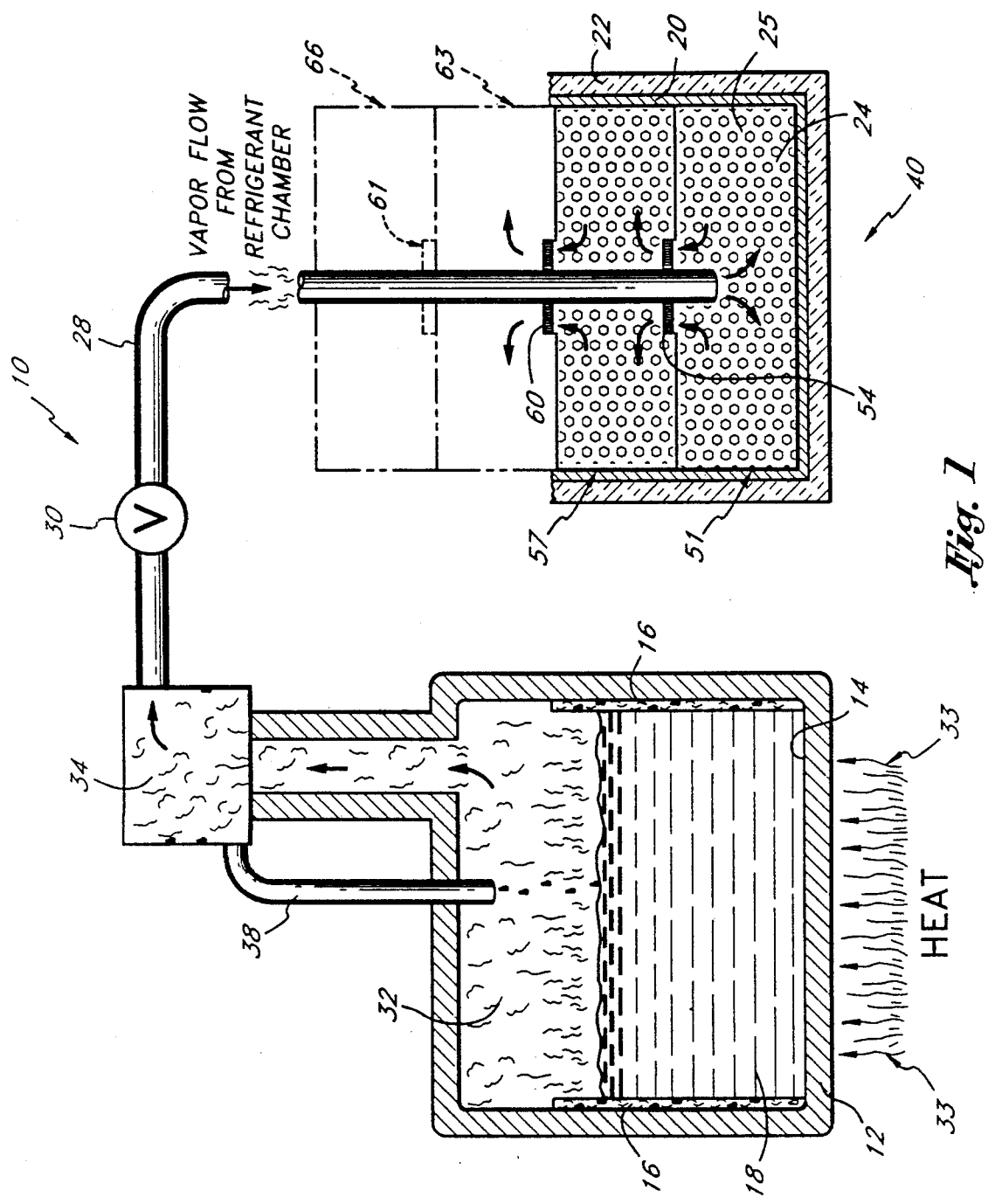
FIG. 1 is a schematic side elevation of the present invention which reveals the contents of the evaporation and desiccant chambers in a cut-away manner.

In FIG. 1, the refrigeration device 10 of the present invention has a refrigerant chamber 12, which may advantageously be lined on the interior surface 14 with a wicking material 16. In a preferred embodiment, the wicking layer may be applied by flocking the interior surface 14 with the wicking material 16. The refrigerant chamber 12 is filled with a refrigerant liquid 18, such as water.

The refrigerant device 10 has associated with it a desiccant system 40, comprising a desiccant chamber 20 divided into a plurality of desiccant modules 51, 57, 63, 66. In one preferred embodiment, the chamber 20 surrounded by a thermal insulator 22, and is at least partially filled with a desiccant 24. Furthermore, the desiccant may be in contact with a heat removing material 25, as disclosed in our U.S. Pat. No. 4,759,191. Separating the individual modules are a series of valves 54, 60, 61.

At least the first desiccant module 51 of the desiccant chamber 20 is initially evacuated, and, preferably, all of the desiccant modules are initially evacuated. In addition, the refrigerant chamber may also advantageously be evacuated to the extent that it contains substantially only the vapor of the refrigerant liquid.

Connecting the refrigerant and desiccant chambers 12 and 20 is a conduit 28 and a valve 30 interposed in the conduit 28, allowing fluid communication between the chambers 12 and 20 through the conduit 28 only when the valve 30 is open.

The operation of the cooling device 10 is suspended (i.e., the system is static and no cooling occurs) until the valve 30 is opened, at which time the conduit 28 permits fluid communication between the refrigerant and chambers 12 and the first desiccant module 51 of the desiccant chamber 20. Opening the valve 30 between the refrigerant and desiccant chambers causes a drop in pressure in chamber 12 because the first desiccant module 51 of the desiccant chamber 20 is evacuated. The drop in pressure in the refrigerant chamber 12 upon opening of the valve 30 causes the liquid 18 to boil at ambient temperature into a liquid-vapor mixture 32.

This liquid-to-gas phase change can occur only if the liquid 18 removes heat equal to the latent heat of vaporization of the evaporated liquid 18 from the refrigerant chamber 12. This causes the refrigerant chamber 12 to cool. The cooled refrigerant chamber 12, in turn, removes heat from its surrounding material, as indicated by the arrows 33.

The liquid-vapor mixture 32 is directed through a liquid-vapor collector and separator 34 of conventional design, which separates any entrained liquid 18 from the vapor, allowing the separated liquid 18 to return to the refrigerant chamber 12 through the liquid return line 38 and allowing the vapor to pass through the conduit 28 into the desiccant chamber 20, flowing into the first desiccant module 51. Once inside the first desiccant module 51, the vapor is absorbed or adsorbed by the desiccant 24. This facilitates the maintenance of a reduced vapor pressure in the refrigerant chamber 12 and allows more of the liquid 18 to boil and become vapor, further reducing the temperature of chamber 12.

The continuous removal of the vapor maintains the pressure in the refrigerant chamber 12 below the vapor pressure of the liquid 18, so that the liquid 18 boils and produces vapor continuously until desiccant 24 is saturated within the first desiccant module 51, or, alternatively, there is a reduction in the cooling capacity of the refrigerant chamber. In order to continue the refrigeration process at this point by keeping the vapor pressure of the desiccant 24 low, a new section of desiccant 24 must be exposed to the vapor. To provide this function, a valve 54 is disposed between the first desiccant module 51 and the second desiccant module 57.

The valve is preferably sensitive to either the temperature within the first desiccant module at the time the desiccant is saturated; the temperature or vapor supply pressure entering the first desiccant module which indicates an increase in the vapor pressure of the desiccant; or, alternatively, any change in temperature or vapor pressure which would indicate a reduction in the refrigerating efficiency of the cooling device 10.

Paraffin waxes with melting temperatures ranging from below 100 degrees (F) to over 250 degrees (F), are known in the art. Such waxes may be advantageously used to comprise the valves 54, 60, 61 of the invention to automatically melt at a preselected temperature and thereby provide communication between the desiccant modules. Other conventional materials having selected melting points could also be used for the valve 54.

At that point in time, the wax valve 54 melts and allows fluid communication between the first desiccant module 51 and the second desiccant module 57. The melting of the wax valve between the first desiccant module 51 and the second desiccant module 57 will preferably coincide with either the temperature of the first desiccant module 51 at the time the desiccant 24 is saturated, or a temperature producing a reduction of vapor supply pressure from the refrigerant chamber 12, indicating a reduction in the refrigerant efficiency of the cooling device 10.

The vapor then flows into the second desiccant module 57 and is absorbed or adsorbed by the desiccant 24 contained within the second desiccant module 57. The continuous removal of the vapor into the second desiccant module 57 will maintain the pressure in the refrigerant chamber 12 below the vapor pressure of the liquid 18, so that the liquid 18 continues to boil and produce vapor continuously until the desiccant 24 within the second desiccant module 57 is saturated.

At this point in time, the second wax valve 60 melts to provide communication between the second desiccant module 57 and the third desiccant module (depicted in phantom at 63) under the conditions described above, thereby continuing the refrigerant process of the cooling device 10. This process continues sequentially until the vapor reaches the last desiccant module of the chamber 20 (depicted in phantom at 66), the refrigerant process preferably continuing until the liquid 18 has boiled away, or until the temperature of the liquid 18 has dropped below its boiling point at the existing pressures within the refrigerant chamber 12.

During the vaporization process, the level of the liquid 18 in the refrigerant chamber 12 drops. The wicking material 16 retains the liquid 18 on the interior surface 14 of the refrigerant chamber 12 to prevent a reduction in the area of contact between the liquid 18 and the interior surface 14, which would cause a reduction in the effective heat transfer surface area of the refrigerant chamber 12 and would thus slow the cooling process.

When the desiccant 24 absorbs or adsorbs the vapor, a heat of absorption or adsorption is generated. The heat removing material 25 which is thermally coupled to the desiccant 24 (and preferably is mixed with the desiccant 24) removes heat from the desiccant 24, preventing or slowing a rise in temperature in both desiccant 24 and chamber 20, which rise in temperature might compromise the cooling effect produced by chamber 12. Tests have shown that paraffin waxes which are readily available and accepted for food use are not only useful as heat sink materials, but have a low enough vapor pressure that they need not be sealed when used in an operational beverage cooler, even when in the molten state. These waxes wet most of the desiccant 24 quickly in the molten state. They can therefore be used to seal the desiccant at the end of their usefulness.

Thus, the multi-staged desiccant refrigeration device 10 of the instant invention arranges the desiccant-heat sink system 40 so that the average vapor pressure of the desiccant system throughout the refrigerating process remains low. To perform this function, the desiccant system 40 utilizes the plurality of separately valved, isolated desiccant modules 51, 57, 63, 66. These desiccant modules function so that when the vapor pressure of the desiccant rises in one module by a rise in temperature of the desiccant, that module automatically closed off and another, which has not yet been exposed to vapor, automatically opened, thereby retaining a constant vapor flow between refrigerant and desiccant by keeping the vapor pressure of the desiccant low. Such a procedure would be useful for applications in which minimizing and sustaining the cooling time is important, such as in a beverage cooling application.

Although the average cooling rate can be increased by such staging, the overall total heat absorption capability generally remains unchanged, since total vapor absorbed as compared with a conventional device and total resulting heat deposition in the desiccant-heat sink module remain unmodified. However, other methods or materials optimizing these conditions may advantageously be used with the device.

As is shown in FIG. 1, the aforementioned configuration allows the construction of the cooling device 10 to be miniaturized and compact. Its size can be greatly reduced by placing the plurality of desiccant modules in a space-conserving configuration, as depicted in FIG. 2.

Figure 2:
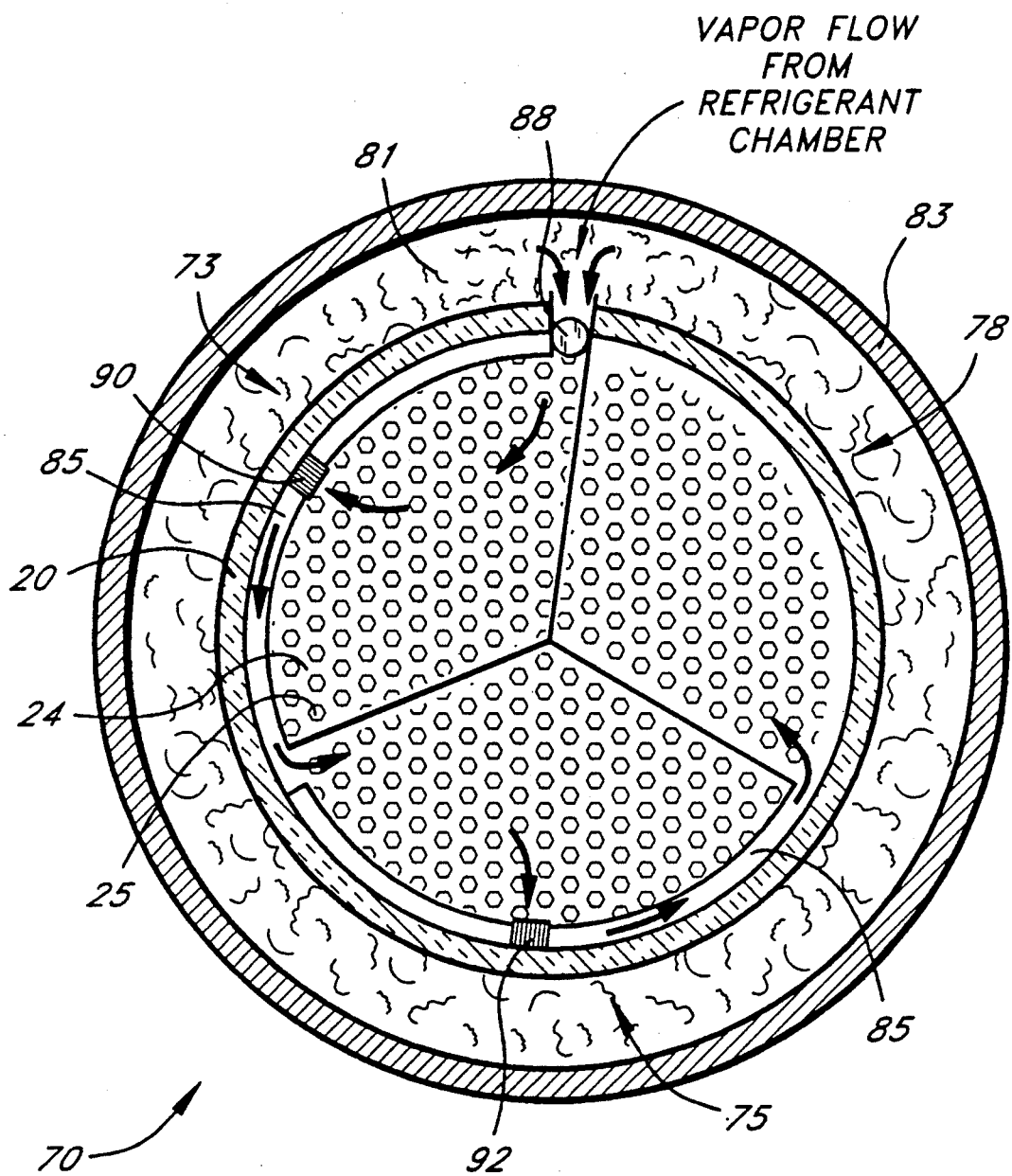
FIG. 2 is a schematic cross section a particular embodiment of the multi-staged desiccant system of the present invention.

An alternative embodiment of the desiccant chamber 70 is depicted in FIG. 2. The desiccant chamber 70 comprises a first desiccant module 73, a second desiccant module 75 and a third desiccant module 78 disposed in a circular configuration, surrounded in a preferred embodiment by a thermal insulator 20, which is at least partially filled with a desiccant 24 in contact with a heat removing material 25.

Again, as described above, the desiccant modules 73, 75, 78 are initially evacuated. Surrounding the structure of the desiccant chambers is a chamber 81 into which vapor from the refrigerant chamber 12 (not shown) is conducted. The chamber 81 may be evacuated advantageously to the extent it allows for flow of vapor from the refrigerant chamber to the desiccant chamber 70. Surrounding the chamber 81 is a thermal insulator 83, which retards the dissipation of heat from the desiccant chamber 70. A channel 85 is disposed around the modules 73, 75, 78, preferably located between the thermal insulator 20 and the modules, to provide vapor communication between the first module 73 and the second module 75, and the second module 75 and the third module 78.

The multiple module desiccant chamber 70 of the instant invention is operated similarly to that described in FIG. 1, wherein the operation of the desiccant chamber is suspended until the valve 30 is open (not shown) at which time the conduit provides fluid communication between the refrigerant chamber (not shown) and the vapor chamber 81, allowing vapor flow from the refrigerant chamber to extend throughout the area of the chamber 81. At this point in time, the trigger valve 88 is opened, causing a drop in pressure in module 73 as the module chamber 73 is evacuated. The opening of the valve 88 allows vapor to pass into the first desiccant module 73. Once inside the first desiccant module 73, the vapor is absorbed or adsorbed by the desiccant 24.

Again, this facilitates the maintenance of the reduced vapor pressure in the refrigerant chamber (not shown) and allows more liquid contained therein to boil and become vapor, further reducing the temperature of the refrigerant chamber.

As previously discussed, the continuous removal of vapor maintains the pressure in the refrigerant chamber below the vapor pressure of the liquid, so that the liquid boils and produces vapor continuously until the desiccant 24 is saturated within the first desiccant module 73. Thus, the first wax valve 90 melts and allows fluid communication through conduit 85 between the first desiccant module 73 and the second desiccant module 75. As the second desiccant module 75 is evacuated, the opening of the valve 90 draws the vapor flow from the refrigerant chamber, through the first desiccant module 73 and into the second desiccant module 75, thereby continuing the cooling process.

The melted wax from the wax valves separating the desiccant modules 73, 75 and 78, may serve a dual purpose. After melting, the wax may be used to seal the desiccant after its usefulness, i.e., after the vapor pressure of the desiccant reaches a designated level. Again, the melting of the wax valve 90 between the first desiccant module 73 and the second desiccant module 75 preferably coincides with either the temperature of the first desiccant module at the time the desiccant is saturated, or, alternatively, a temperature producing a reduction of vapor supply pressure from the refrigerant chamber indicating a reduction in the refrigerant efficiency of the cooling device.

The vapor then flows within the second desiccant module 75 and is thus absorbed or adsorbed by the desiccant 24 contained within the second desiccant module 75. Again, the second desiccant module 75 continues to absorb the water vapor until the desiccant 24 within it is saturated, at which point in time the second wax valve 9 melts at the designated temperature to provide fluid communication between the second desiccant module 75 and the third desiccant module 78 through surrounding conduit 85. As previously explained, the melting of the second wax valve 92 may also serve to seal off the desiccant 24 contained within the second desiccant module 75. As before, the evacuated third desiccant module 78, when breached by the melting of the second wax valve 92, creates a negative pressure which produces a flow of the vapor through the first and second modules into the third desiccant module. The cooling process continues as previously stated, until the liquid 18 has boiled away or until the temperature of the liquid has dropped below its boiling point.

The present invention may consist of any of a number of desiccant modules, the number of modules and their desiccant capacity preferably dependent upon and matched with the refrigerant capacity of the liquid refrigerant used in the system.

Three important components of the present invention are the evaporating liquid, the desiccant and the heat removing material. The liquid and the desiccant must be complimentary (i.e., the desiccant must be capable of absorbing or adsorbing the vapor produced by the liquid), and suitable choices for these components would be any combination able to make a useful change in temperature in a short time, meet government standards for safety and be compact.

The refrigerant liquids used in the present invention preferably have a high vapor pressure at ambient temperature, so that a reduction of pressure will produce a high vapor production rate. The vapor pressure of the liquid at 20° C. is preferably at least about 9 mm Hg, and more preferably is at least about 15 or 20 mm Hg. Moreover, for some applications (such as cooling of food products), the liquid should conform to applicable government standards in case any discharge into the surroundings, accidental or otherwise, occurs. Liquids with suitable characteristics for various uses of the invention include: various alcohols, such as methyl alcohol and ethyl alcohol; ketones or aldehydes, such as acetone and acetaldehyde; water; and freons, such as freon C318, 114, 21, 11, 114B2, 113 and 112. The preferred liquid is water.

In addition, the refrigerant liquid may be mixed with an effective quantity of a miscible nucleating agent having a greater vapor pressure than the liquid to promote ebullition so that the liquid evaporates even more quickly and smoothly, and so that supercooling of the liquid does not occur. Suitable nucleating agents include ethyl alcohol, acetone, methyl alcohol, propyl alcohol and isobutyl alcohol, all of which are miscible with water. For example, a combination of a nucleating agent with a compatible liquid might be a combination of 5% ethyl alcohol in water or 5% acetone in methyl alcohol. The nucleating agent preferably has a vapor pressure at 25° C. of at least about 25 mm Hg and, more preferably, at least about 35 mm Hg. Alternatively, solid nucleating agents may be used, such as the conventional boiling stones used in chemical laboratory applications.

The desiccant material used in the desiccant chamber 21 is preferably capable of absorbing and adsorbing all the vapor produced by the liquid, and also preferably will meet government safety standards for use in an environment where contact with food may occur. Suitable desiccants for various applications may include barium oxide, magnesium perchlorate, calcium sulfate, calcium oxide, activated carbon, calcium chloride, glycerine, silica gel, alumina gel, calcium hydride, phosphoric anhydride, phosphoric acid, potassium hydroxide, sulfuric acid, lithium chloride, ethylene glycol and sodium sulfate.

The heat-removing material may be one of three types: (1) a material that undergoes a change of phase when heat is applied; (2) a material that has a heat capacity greater than the desiccant; or (3) a material that undergoes an endothermic reaction when brought in contact with the liquid refrigerant.

Suitable phase change materials for particular applications may be selected from paraffin, naphthalene, sulphur, hydrated calcium chloride, bromocamphor, cetyl alcohol, cyanamide, eleudic acid, lauric acid, hydrated sodium silicate, sodium thiosulfate pentahydrate, disodium phosphate, hydrated sodium carbonate, hydrated calcium nitrate, Glauber's salt, potassium, sodium and magnesium acetate. The phase change materials remove some of the heat from the desiccant material simply through storage of sensible heat. In other words, they heat up as the desiccant heats up, removing heat from the desiccant. However, the most effective function of the phase change material is in the phase change itself. An extremely large quantity of heat can be absorbed by a suitable phase change material in connection with the phase change (i.e., change from a solid phase to a liquid phase, or change from a liquid phase to a vapor phase). There is typically no change in the temperature of the phase change material during the phase change, despite the relatively substantial amount of heat required to effect the change, which heat is absorbed during the change. Phase change materials which change from a solid to a liquid, absorbing from the desiccant their latent heat of fusion, are the most practical in a closed system. However, a phase change material changing from a liquid to a vapor is also feasible. Thus, an environmentally-safe liquid could be provided in a separate container (not shown) in contact with the desiccant material (to absorb heat therefrom) but vented in such a way that the boiling phase change material carries heat away from the desiccant material and entirely out of the system.

Another requirement of any of the phase change materials is that they change phase at a temperature greater than the expected ambient temperature of the material to be cooled, but less than the temperature achieved by the desiccant material upon absorption of a substantial fraction (i.e., one-third or one-quarter) of the refrigerant liquid. Thus, for example, in most devices according to the present invention which are intended for use in cooling a material such as a food or beverage, the phase change material could change phase at a temperature above about 30° C., preferably above about 35° C. but preferably below about 70° C., and most preferably below about 60° C. Of course, in some applications, substantially higher or lower phase change temperatures may be desirable. Indeed, many phase change materials with phase change temperatures as high as 90° C., 100° C. or 110° C. may be appropriate in certain systems.

Materials that have a heat capacity greater than that of the desiccant simply provide a thermal mass in contact with the desiccant that does not effect the total amount of heat in the system, but reduces the temperature differential between the material being cooled and the desiccant chamber, with two results. First, the higher the temperature gradient between two adjacent materials, the more rapid the rate of heat exchange between those two materials, all else being equal. Thus, such thermal mass materials in the desiccant chamber slow the transfer of heat out of the desiccant chamber. Second, many desiccant materials function poorly or do not function at all when the temperature of those materials exceeds a certain limit. Heat-absorbing material in the form of a thermal mass can substantially reduce the rate of the desiccant's temperature increase during the cooling cycle. This, in turn, maintains the desiccant at a lower temperature and facilitates the vapor-sorption capabilities of the desiccant. Various materials which have a high specific heat include cyanamide, ethyl alcohol, ethyl ether, glycerol, isoamyl alcohol, isobutyl alcohol, lithium hydride, methyl alcohol, sodium acetate, water, ethylene glycol and paraffin wax.

Care must be taken, of course, when selecting a high specific heat material (or high thermal mass material) to ensure that it does not interfere with the functioning of the desiccant. If the heat-absorbing material, for example, is a liquid, it may be necessary to package that liquid or otherwise prevent physical contact between the heat-absorbing material and the desiccant. Small individual containers of heat-absorbing material scattered throughout the desiccant may be utilized when the desiccant and the heat-absorbing material cannot contact one another. Alternatively, the heat-absorbing material may be placed in a single package having a relatively high surface area in contact with the desiccant to facilitate heat transfer from the desiccant into the heat-absorbing material.

The third category of heat-removing material (material that undergoes an endothermic reaction) has the advantage of completely removing heat from the system and storing it in the form of a chemical change. The endothermic material may advantageously be a material that undergoes an endothermic reaction when it comes in contact with the refrigerant liquid (or vapor). In this embodiment of the invention, when the valve 30 in the conduit 28 is opened, permitting vapor to flow through the conduit 28 into the third chamber 21, the vapor comes in contact with some of the endothermic material, which then undergoes an endothermic reaction, removing heat from the desiccant 24. Such endothermic materials have the advantage that the heat is more or less permanently removed from the desiccant, and little, if any, of that heat can be retransferred to the material being cooled. This is in contrast to phase change materials and materials having a heat capacity greater than the desiccant material, both of which may eventually give up their stored heat to the surrounding materials, although such heat exchange (because of design factors that retard heat transfer, such as poor thermal conductivity of the desiccant 24) generally does not occur with sufficient rapidity to reheat the cooled material prior to use of that material.

Heat-absorbing materials which undergo an endothermic reaction may variously be selected from such compounds as $H_2BO_3$, $PbBr_2$, $KBrO_3$, $KClO_3$, $K_2Cr_2O_7$, $KClO_4$, $K_2S$, $SnI_2$, $NH_4Cl$, $KMnO_4$ and $CsClO_4$. Furthermore, the heat-removing material may be advantageously in contact with the desiccant. In various embodiments of the invention, the desiccant and heat-removing material could be blended, the heat-removing material could be in discrete pieces mixed with the desiccant, or the material could be a mass in contact with, but not mixed into, the desiccant.

In selecting the wicking material 16, any of a number of materials may be chosen, depending upon the requirements of the system and the particular refrigerant liquid 18 being used. The wicking material may be something as simple as cloth or fabric having an affinity for the refrigerant liquid 18 and a substantial wicking ability. Thus, for example, when the refrigerant liquid is water, the wicking material may be cloth, sheets, felt or flocking material which may be comprised of cotton, filter material, natural cellulose, regenerated cellulose, cellulose derivatives, blotting paper or any other suitable material.

The most preferred wicking material would be highly hydrophilic, such as gel-forming polymers which would be capable of coating the interior surface of the evaporation chamber. Such materials preferably consist of alkyl, aryl and amino derivative polymers of vinylchloride acetate, vinylidene chloride, tetrafluoroethylene, methyl methacrylate, hexanedoic acid, dihydro-2,5-furandione, propenoic acid, 1,3-isobenzofurandione, 1 h-pyrrole-2,5-dione or hexahydro-2 h-azepin-2-one.

The wicking material may be sprayed, flocked, or otherwise coated or applied onto the interior surface of the refrigerant chamber 12. In a preferred embodiment, the wicking material is electrostatically deposited onto that surface. In another embodiment, the wicking material is mixed with a suitable solvent, such as a non-aqueous solvent, and then the solution is applied to the interior surface of the refrigerant chamber 12.

In another preferred embodiment, the wicking material is able to control any violent boiling of the evaporator and thus reduces any liquid entrainment in the vapor phase. In such an embodiment, the wicking material is a polymer forming a porous space-filling or sponge-like structure, and it may fill all or part of the refrigerant chamber 12.

The valve 30 may be selected from any of the various types shown in the prior art. The valve 30 may be located at any location between the refrigerant chamber 12 and the desiccant chamber 20 so long as it prevents vapor from being sorbed by the desiccant 24. However, if the entire device 10 is within a pressurized container, a pressure responsive valve can be used which can actuate the cooling device upon the release of the pressure within the container.

The invention also includes a method of using the cooling device described herein. This method includes the step of providing a cooling device of the type set forth herein; opening the valve between the refrigerant chamber 12 and the desiccant chamber 20, whereby the pressure in the refrigerant chamber is reduced, causing the liquid to boil, forming a vapor, which vapor is collected by the desiccant material; removing vapor from the desiccant chamber by collecting the same in the desiccant until an equilibrium condition is reached wherein the desiccant is substantially saturated or substantially all of the liquid originally in the refrigerant chamber has been collected in the desiccant; and simultaneously removing heat from the desiccant by means of the heat-removing material described above. The process is preferably a one-shot process; thus, opening of the valve 30 in the conduit 28 connecting the refrigerant chamber 12 and the desiccant chamber 20 is preferably irreversible. At the same time, the system is a closed system; in other words, the refrigerant liquid does not escape the system, and there is no means whereby the refrigerant liquid or the desiccant may escape either the refrigerant chamber 12 or the desiccant chamber 20.

Although the invention has been described in the context of certain preferred embodiments, it is intended that the scope of the invention not be limited to the specific embodiment set forth herein, but instead be measured by the claims that follow.

What is claimed is:

1. A refrigeration apparatus, comprising:
    a refrigerant chamber containing an evaporatable refrigerant liquid;
    a plurality of desiccant chambers, each containing a sorbent material for said liquid;
    at least one conduit for conducting vaporized refrigerant liquid to said chambers; and
    one or more valving means for directing said vapor to each said chamber in sequence, so that sorbent in a first such chamber contacts said vapor first, until at least a portion of the sorptive capacity of the sorbent in the first chamber is exhausted, and then a first said valving means directs said vapor into a second such chamber in response to a temperature of the first chamber.

2. The apparatus of claim 1, wherein said valving means open when they attain a predetermined temperature.

3. The apparatus of claim 2, wherein said valving means opened by the melting of a phase change material.

4. The apparatus of claim 3, wherein said phase change material is a wax.

5. The apparatus of claim 4, wherein said wax is a paraffin wax.

6. The apparatus of claim 1, wherein a second said valve directs said vapor into a third such chamber after at least a portion of the sorptive capacity of sorbent in said second chamber is exhausted.

7. The apparatus of claim 1, wherein said refrigerant chamber contains a wicking material adapted to increase the surface area from which evaporation of said liquid can take place.

8. The apparatus of claim 7, wherein said wicking material lines the interior surface of said refrigerant chamber.

* * * * *